Oct. 22, 1957  K. W. BINDING ET AL  2,810,811
TIME CONTROLLED APPARATUS WITH ELECTROMECHANICAL RELAY
Filed Oct. 26, 1954  2 Sheets-Sheet 1

Inventors
Kenneth W. Binding
Harold N. Shaw
by Roberts, Cushman & Grover
Att'ys

Oct. 22, 1957 K. W. BINDING ET AL 2,810,811
TIME CONTROLLED APPARATUS WITH ELECTROMECHANICAL RELAY
Filed Oct. 26, 1954 2 Sheets-Sheet 2

Inventors
Kenneth W. Binding
Harold N. Shaw
by Roberts, Cushman & Grover,
Att'ys

United States Patent Office 2,810,811
Patented Oct. 22, 1957

2,810,811

TIME CONTROLLED APPARATUS WITH ELECTROMECHANICAL RELAY

Kenneth W. Binding, Winchester, Mass., and Harold N. Shaw, Erie, Pa., assignors to Market Forge Company, Everett, Mass., a corporation of Massachusetts Application October 26, 1954, Serial No. 464,852

4 Claims. (Cl. 219—20)

The present invention relates to electromechanical control systems and is particularly applicable to electrically and pressurally timed and regulated steam generating systems; it includes such systems as well as electromechanical relay apparatus combined with, and particularly suited for these systems.

It is one of the principal objects of the present invention to provide simple and reliable means for controlling the pressure and operation time of steam cooking installations, including the disconnection of the power at the end of the operation.

Other objects are to provide an especially compact device to accomplish the above operation, for use in a limited space which may be subject to comparatively high temperatures, to provide heating apparatus and a control device therefor which applies a comparatively high energy input for starting whereas the normal operation, of predetermined duration, is accomplished and regulated independently of the starting operation, and to provide particularly simple, rugged and yet sensitive and reliable relay actuating mechanism which responds to pressure as well as electrical impulses or conditions.

A system according to the invention comprises, in one of its principal aspects, two electric heating elements, a control relay which in inoperative condition disconnects both heating elements from their power supply, which upon initial energization connects both heating elements, which disconnects one element when the system comes into normal operating condition and thereupon maintains this condition by regulating the second heating element, the control relay being supervised by a timer which starts the cycle and disconnects the heating elements after a predetermined time from the beginning of normal operating conditions. In a preferred embodiment, a relief valve is opened upon disconnection of the heating elements at the end of the cycle.

The control relay according to the invention comprises a starting switch having two contact members, a lifting member associated with the switch and biased to cause in inactive condition circuit making contact of the two contact members, an actuator adapted to move the lifting member against its bias to break circuit by separating the contact members, starting means for holding, when de-energized, the actuator against the bias of the lifting member to separate the two contact members and for releasing, when energized, the actuator and the lifting member to make circuit by closing the contact members, and control mans for moving the lifting member against its bias to separate the contact members, whereby the switch can be actuated by the control means only while said starting means is energized. In an embodiment which is especially suited for controlling systems according to the invention, two switches are provided which have different gaps, a starting switch remaining open during normal operation for disconnecting one of the above heating elements, whereas a regulating switch is opened and closed during normal operation by the control means which in this instance responds to steam pressure in the cooker.

These and other objects, and aspects of the invention will appear from the following description of a typical embodiment illustrating its novel characteristics. This description refers to drawings in which.

Figures 1, 2:
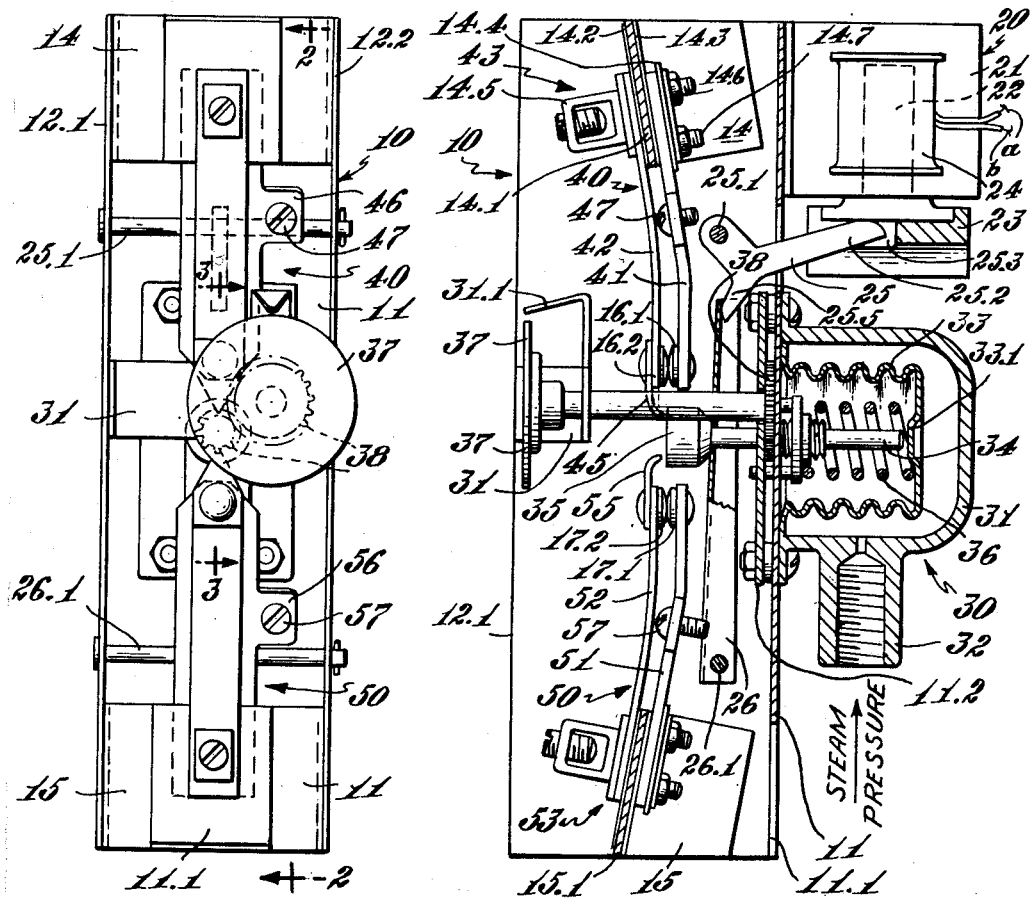
Fig. 1 is a side elevation of the control relay.
Fig. 2 is a section on lines 2—2 of Fig. 1.
Figure 3:
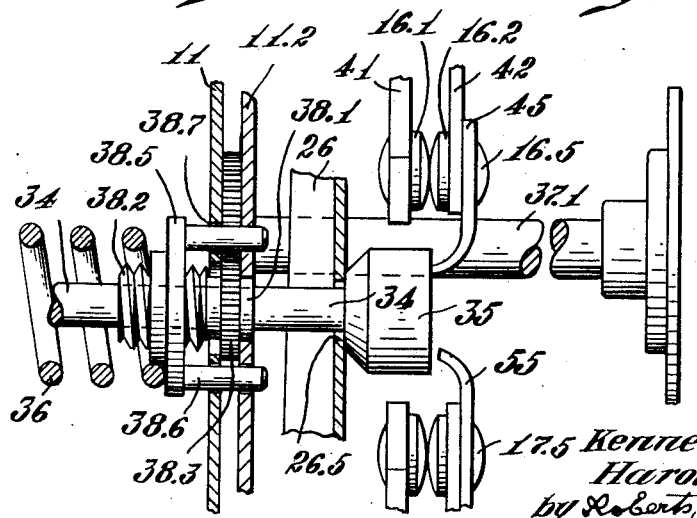
Fig. 3 is an enlarged side elevation, partly in section, of the control knob detail of the relay according to Figs. 1 and 2, seen from the side opposite to that shown in Fig. 2.
Figure 4:
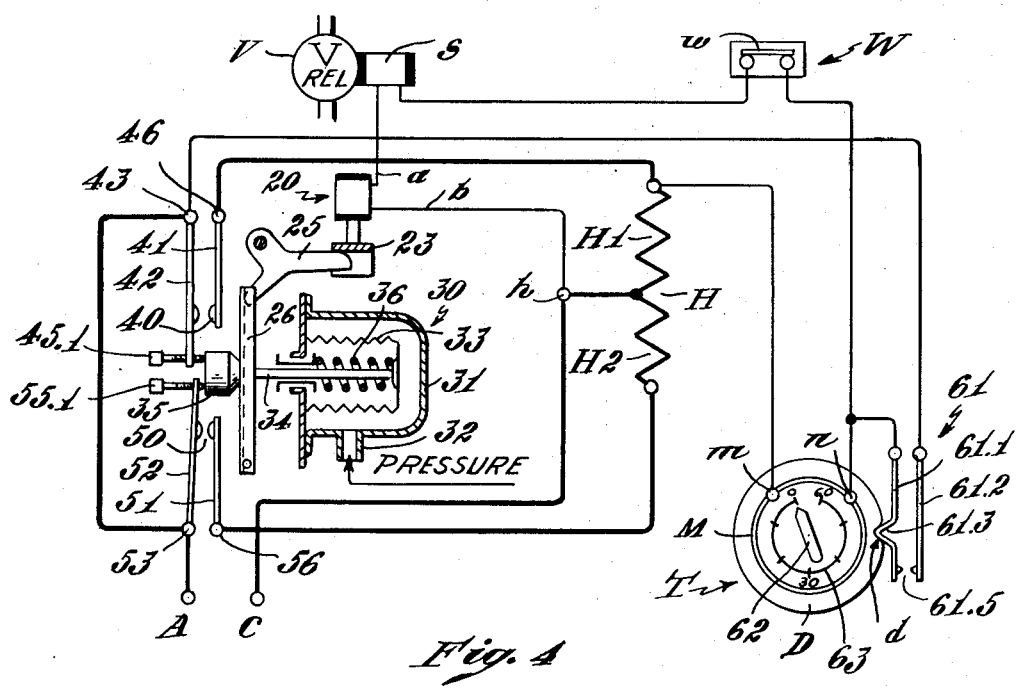
Fig. 4 is a schematical representation of a steam cooking installation including a diagram of the control relay according to Figs. 1 to 3.
Figure 5:
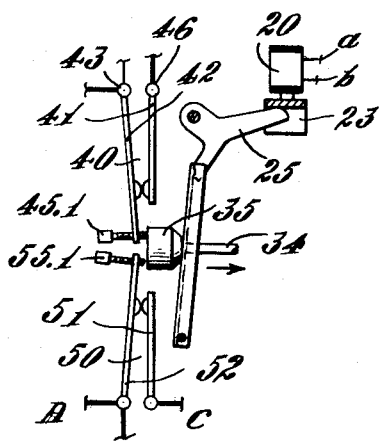
Figs. 5 and 6 are diagrams of the control relay as shown in Fig. 4 indicating two operative positions in addition to the inoperative position shown in Fig. 4, the position in Fig. 5 corresponding to that of Figs. 2 and 3.
Figure 6:
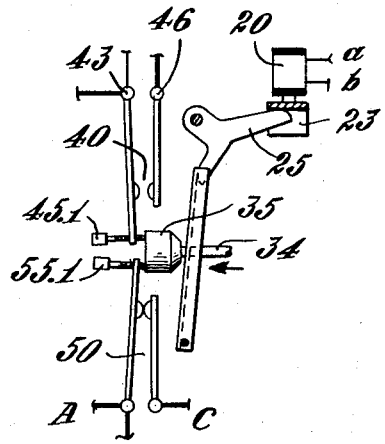

Figs. 1 to 3 illustrate the above characterized control relay which is also diagrammatically indicated in Figs. 4, 5 and 6 within the controlled installation. Figs. 1 and 2 show a frame structure consisting of a channel 10 with a web 11 and two flanges 12.1 and 12.2. The web is cut out at 11.1 to provide access to the switch terminals to be described below. On its back, the web 11 carries a solenoid 20 and a pressure actuated bellows controlled device 30. The channel 10 of the frame carries two contact arm brackets 14 and 15 across each end which brackets are spot-welded to the flanges 12.1 and 12.2. An additional bracket 31 carries the adjusting device to be described below, and also serves as an indicator and stop for the adjusting device, as indicated at 31.1 of Fig. 2.

Each bracket 14, 15 supports a switch assembly 40, 50 respectively. These are herein also referred to as starting switch means and control switch means, respectively. Each switch assembly consisting of a rigid contact arm 41, 51 and of a contact spring 42, 52, respectively. Each switch assembly has a double binding post assembly 43, 53 respectively, these posts being in electrical contact with the contact springs 42, 52, respectively, but insulated from brackets 14, 15 and contact arms 41, 51 respectively. The contact arms are separated from both the brackets and the binding posts by insulation, as indicated for bracket 14 by insulating sheets 14.2, 14.3 on respective sides of the web 14.1 of bracket 14, and by insulating plate 14.4 between contact arm 41 and the studs of the binding post proper which is indicated at 14.5. This post has two studs 14.6 and 14.7 which reach through parts 42, 14.1, and 41 and are insulated from contact arm 41 and web 14.1 by insulating bushings which are not shown. The nuts of the studs 14.6, 14.7 hold the binding post assemblies securely in position on the brackets 14, 15, the two studs preventing any twisting out of line of the parts of this assembly.

The ends of the contact arms 41, 51 and of the contact springs 42, 52 are provided with large silver contacts 16.1, 16.2 and 17.1, 17.2, as indicated in Figs. 2 and 3. The contacts 16.2 and 17.2 also fasten, with their rivet heads 16.5, 17.5 (Fig. 3), the fingers 45, 55 to the ends of the contact springs 42, 52, respectively. The contact arms 41, 51 are curved to bend the normally straight contact springs 42, 52 backward to provide sufficient contact pressure. Auxiliary terminal ears 46, 56, are provided on the contact arms 41, 51, for binding posts 47, 57. The fingers 45, 55 are bent to different heights, or they can carry adjusting screws as indicated in Fig. 4.

The solenoid 20 constitutes primarily a starting means and, as mentioned above, is fastened to the web 11 of the channel 10. This solenoid has a yoke 21 and an armature plunger 22 which is weighted with a lead block 23 of sufficient weight to overcome the bias of the switch lifting mechanism to be described below. If the solenoid coil 24 is energized through wires *a*, *b* (Figs. 2 and 4), plunger 22 is lifted thereby permitting counterclockwise rotation (referred to Fig. 2), of a cam lever 25 which is pivoted at 25.1 by means of a pin fastened in appropriate holes of flanges 12.1 and 12.2 of the frame channel 10, and has a finger 25.2 and a cam 25.5. The finger 25.2 moves in a slot 25.3 of the block 23. The cam 25.5 rests against the free end of an actuator, here a channel shaped actuating lever 26 which is pivoted on a pin 26.1 which, similar to pin 25.1, rests in two perforations of the flanges of channel 11. The channel lever 26 has a hole 26.5 (Fig. 3) for the pressure pin 34 of the actuator now to be described.

The bellows device 30, constituting a control means for the actuator, has a housing 31 with a steam admission port 32. The housing contains a bellows 33 and one end of a pin 34, the other end of which carries a switch lifting member such as a knob 35 of insulating material which is located between the channel lever 26 and the switch spring fingers 45 and 55, both described above. As shown in Figs. 2 and 3, a spring 36 within the bellows tends to extend the bellows, and the pin 34 is pressed against the inwardly extending platform 33.1 of the bellows by the switch spring fingers 45, 55. The pressure that is exerted by the spring 36 can be adjusted by turning the dial 37, which, by means of a shaft 37.1 and a gear train 38 rotates a sleeve 38.1 with an outside thread 38.2. By means of the gear 38.3, confined between web 11 and plate 11.2 this sleeve is secured against movement of pin 34. The thread 38.2 of the sleeve moves a platform 38.5 in axial direction, the platform being secured against rotary motion by two studs 38.6 which slide in perforations 38.7 of the channel web 11 and the auxiliary plate 11.2 fastened thereto as shown in Fig. 2. It will now be evident that rotation of dial 37 rotates gear train 38 and sleeve 38.1, and moves platform 38.5 axially on pin 34. Spring 36, between platforms 33.1 and 38.5 is therefore more or less tensioned by rotation of dial 37.

Although the above described pressure-electric relay device has general usefulness, it is particularly applicable to installations of the type now to be described with reference to Fig. 4.

Fig. 4 indicates the elements of a steam cooking installation as follows. H is an electric heating element with two branches H1 and H2 separated by terminal *h*. V is the vent valve of the steam apparatus which valve is in conventional manner operated by a solenoid S, the valve remaining closed when the solenoid is energized. The vent valve V opens upon deenergization of solenoid S whereupon the steam pressure in the cooker is allowed to drop. A conventional low water cut-off is indicated at W. This device opens the switch *w* before the steamer bottom is overheated. A starting and timing device is indicated at T. This consists of a synchronous motor M which is supplied at terminals *m* and *n* and drives in conventional manner a timing disc D having a notch *d*. The timing disc D is associated with a timing switch 61 with two contact springs 61.1 and 61.2. Spring 61.1 has a follower portion 61.3 which, when it encounters the cam notch *d* permits the spring 61 to open, whereas the switch 61 is closed at contacts 61.5 when follower 61.3 rides on the periphery of disc D. The relative position of notch *d* and follower 61.3 can be adjusted by means of a conventional mechanism which is set by means of dial 62 which permits the setting of a predetermined time period, for example in seconds on a properly subdivided scale 63.

The principal components of the relay apparatus as described above with reference to Figs. 1 to 3 are likewise indicated in Fig. 4 and therefore need no further description. Fig. 4 shows solenoid 20 in deenergized condition with weight block 23 in lowered position, cam lever 25 rotated clockwise, and lever 26 therefore rotated counterclockwise, moving knob 35 towards the left and moving contact springs 42, 52 away from the contacts of contact arms 41, 51. The contact spring fingers 45, 55 are here replaced by screws 45.1, 55.1 in order to indicate another possibility of adjusting the respective contact gaps. The bellows housing 31 is at 32 connected to the cooker. The above elements are electrically connected as follows.

The terminal A of a standard electrical supply line is connected to the terminal blocks of contact springs 42 and 52, whereas line terminal C leads to the midpoint *h* of heater element H, separating it into the above mentioned components H1 and H2. The outer end of element H1 is connected to the terminal of contact arm 41 whereas the outer end of heater component H2 is connected to the terminal of contact arm 51.

The low water thermostat W, the relief valve solenoid S, and the relay solenoid 20 are connected in series between motor terminal *n* and the midpoint *h* of the heater H.

The timer switch 61 is connected between the motor terminal *n* and the contact spring 42. The other motor terminal *m* is connected to the outer end of heater element H1 and with it to contact arm 41.

Systems according to the invention operate as follows, reference being had by way of example to the installation diagrammatically indicated in Fig. 4 which may be assumed to be a large scale food processing plant operating with high pressure steam of say 10 to 15 lbs., and for operational reasons necessitating rapid generation of steam of the temperature required, within the shortest possible starting period.

In cold condition without pressure steam in the plant and with the starting switch T in the position shown in Fig. 4, solenoid 20 is deenergized, the weight 23 forces the channel lever 26 to move the knob 35 against the biasing force of the switch springs 42, 52, and both switches 40 and 50 are open. The relief valve V is open and the safety switch W is closed. The heating elements H are disconnected and cold.

In order to start the plant, the timer control knob 62 is turned to close switch 61 and to set the timer for disengagement of the switch 61 after a given cooking period, say 20 minutes, from the instant when the motor M is energized.

The closing of switch 61 of timer T energizes solenoids S and 20 in the circuit A–42–61–W–S–20–*h*–C. The solenoid S closes the relief valve and the solenoid 20 lifts the block 23 and releases the channel lever 26, permitting the knob 35 to move towards the righthand side of Fig. 4, following the biasing pressure of switch springs 42, 52. Both switches 40 and 50 close and the heater element H is energized, one branch in circuit A–42–41–H1–*h*–C, and the other branch in circuit A–52–51–H2–*h*–C, with the components H1 and H2 in parallel connection. With both heater elements energized, steam is quickly generated and brought to the desired pressure. This condition of the relay is shown in Figs. 2, 3 and 5.

When the pressure in the cooker rises to say approximately 10 pounds, assuming this to be the lower limit of the normal operating pressure, then the steam admitted at 32 of the bellows device and compressing the bellows against the force of spring 36, pushes knob 35 towards the left hand side of Fig. 4 such as to lift the upper contact spring 42 of starting switch 40, as shown in Fig. 6. The control or regulating switch 50 remains closed, due to the lesser height of finger 55 or of adjusting screw 55.1.

The pressure at which this action occurs such as 10 pounds as herein assumed, is determined by the setting of the dial 37, which can be calibrated with relation to the compression of the bellows spring 36, and the adjustment of the switch gaps by means of screws 45.1 and 55.1 or, in the practical example described with reference to Figs. 2 and 3, by the height of the switch spring fingers 45 and 55.

At this stage, element H1 is disconnected, element H2 being sufficient to maintain and slowly to increase the steam pressure after it has been rapidly developed through the energy supplied by both elements H1 and H2. The pressure continues to rise, but when its upper limit, say 15 pounds is reached, the bellows has moved knob 35 sufficiently towards the left of Fig. 4 to open switch 50, thereby dsiconnecting element H2. During normal operation the pressure is thus controlled by the opening and closing of regulating switch 50, as the pressure never drops low enough to close the starting switch 40. Thus, with a desired continuous operating pressure of about 15 pounds, the regulating switch 50 is set to open at 15 pounds, whereas the starting switch is set to open at 10 pounds, these settings being accomplished, as mentioned above, by means of screws 45.1 and 55.1, or by appropriately bending the switch spring fingers 45, 55.

The timer motor M is shunted and deenergized so long as switch 40 is closed. Since this switch closes immediately upon starting the cycle by turning the timer from the position shown in Fig. 4 to close switch 61, the motor is deenergized during the starting period when switch 40 is closed and the timer therefore will not yet start its operation. The timer motor is energized and starts its timing cycle when switch 40 opens, that is when a certain pressure such as 10 pounds is reached, which terminates the starting period by opening the starting switch 40 and initiates the normal run with switch 50 closing and opening for regulating purposes. During the normal run, the timer motor M is energized in circuit A–42–61–$n$–M–$m$–H1–$h$–C. This circuit contains the heater element H1 but the timer motor takes so little current that the voltage drop across this resistance is negligible.

When the timer has moved to the end of its setting, then its switch spring follower 61.3 falls again into notch $d$ and opens switch 61. The solenoid 20 is deenergized and weight 23 drops and moves the lever 26 towards the left, lifting both switch springs 42 and 52 from their respective switch arm contacts. The timer switch 61 also disconnects the timer motor circuit and deenergizes the solenoid S causing the relief valve V to open allowing the steam pressure in the cooker to drop.

The relay circuit is also opened with the above effect, if the low water thermostat W should open the switch $w$ because the steamer bottom is overheated.

The device is now again in the condition shown in Fig. 4 with the plant inoperative and ready for the next cycle, to be started by setting the timer to a desired cooking period.

It will now be apparent that the above described device provides, following a setting of a single control namely knob 62 of timer T, rapid initial heating, maintenance of a predetermined pressure for a predetermined period of time, and for making the plant ready for the next cycle, with the required safety provisions automatically included.

We claim:

1. A heating system comprising two heating elements, starting switch means for connecting one of said heating elements to an energy supply, control switch means for connecting the other heating element to an energy supply, starting means for opening both switch means when de-energized and for closing both switch means when energized, and pressure actuated regulating means for opening said starting switch means at a predetermined minimum pressure and for opening and closing said control switch means at a predetermined maximum and minimum pressure, respectively, whereby said minimum pressure is quickly attained by energization of both heating elements and pressure within said maximum and minimum pressure is maintained by regulating said second heating element.

2. A heating system comprising two heating elements, starting switch means for connecting one of said heating elements to an energy supply, control switch means for connecting the other heating element to an energy supply, starting means for opening both switch means when de-energized and for closing both switch means when energized, pressure actuated regulating means for opening said starting switch means at a predetermined minimum pressure and for opening and closing said control switch means at a predetermined maximum and minimum pressure, respectively, and timing means for energizing said starting means and for energizing said regulating means during a predetermined period from the time when said minimum pressure is first reached, whereby said minimum pressure is quickly attained by energization of both heating elements and pressure within said maximum and minimum pressures is maintained during a predetermined period by regulating said second heating element.

3. A heating system comprising two electric heating elements; a control relay including a starting switch for connecting one of said heating elements to an energy supply, a regulating switch for connecting the other heating element to an energy supply, electrically actuated starting means for opening both starting and regulating switches when de-energized and for closing both switches when energized, and pressure actuated regulating means for opening said starting switch substantially at a predetermined minimum pressure and for opening and closing said regulating switch substantially at a predetermined maximum and minimum pressure, respectively; and timing means for energizing said starting switch, and for releasing said regulating means to open and close said regulating switch during a predetermined period from the time when said minimum pressure is first reached; whereby said minimum pressure is quickly attained by energization of both heating elements and pressure within said maximum and minimum pressures is maintained by regulating said second heating element.

4. A heating system comprising two electric heating elements; a control relay including a starting switch for connecting one of said heating elements to an energy supply, a regulating switch for connecting the other heating element to an energy supply, electrically actuated starting means for opening both starting and regulating switches when de-energizd and for closing both switches when energized, and pressure actuated regulating means for opening said starting switch substantially at a predetermined minimum pressure and for opening and closing said regulating switch substantially at a predetermined maximum and minimum pressure, respectively; means for initially energizing said starting switch and said regulating switch; and timing means energized by the opening of said starting switch, said timing means deenergizing both, starting and regulating, switches at the end of a predetermined period; whereby said minimum pressure is quickly attained by energization of both heating elements and pressure within said maximum and minimum pressures is maintained by regulating said second heating element.

References Cited in the file of this patent

UNITED STATES PATENTS

| 2,026,596 | Ross | Jan. 7, 1936 |
| 2,229,261 | Stiebel | Jan. 21, 1941 |
| 2,342,615 | Newton | Feb. 22, 1944 |
| 2,434,467 | McCormick | Jan. 13, 1948 |
| 2,440,128 | Sullivan | Apr. 20, 1948 |
| 2,480,538 | Barr | Aug. 30, 1949 |
| 2,506,623 | Williams | May 9, 1950 |
| 2,515,879 | Korn | July 18, 1950 |